US008776963B2

(12) United States Patent
Bergonnier et al.

(10) Patent No.: US 8,776,963 B2
(45) Date of Patent: Jul. 15, 2014

(54) DEVICE FOR DAMPING THE MOVEMENT OF A BODY AT THE END OF TRAVEL

(75) Inventors: Hélène Bergonnier, Figeac (FR); Eric Delbos, Lacapelle-Marival (FR)

(73) Assignee: Ratier Figeac, Figeac Cedex (FR)

( * ) Notice: Subject to any disclaimer, the term of this patent is extended or adjusted under 35 U.S.C. 154(b) by 346 days.

(21) Appl. No.: 13/048,515

(22) Filed: Mar. 15, 2011

(65) Prior Publication Data

US 2011/0226571 A1 Sep. 22, 2011

(30) Foreign Application Priority Data

Mar. 16, 2010 (FR) ...................................... 10 51865

(51) Int. Cl.
*F16F 9/48* (2006.01)

(52) U.S. Cl.
USPC ........................................ 188/284; 267/64.26

(58) Field of Classification Search
USPC ............. 188/284, 304, 282.8, 317; 267/64.26
See application file for complete search history.

(56) References Cited

U.S. PATENT DOCUMENTS

| 3,375,001 | A |   | 3/1968  | Hennells |
| 3,871,678 | A | * | 3/1975  | Taft et al. .................. 267/64.16 |
| 4,088,286 | A |   | 5/1978  | Masclet et al. |
| 4,915,364 | A | * | 4/1990  | Perlini ........................ 267/64.26 |
| 5,024,301 | A | * | 6/1991  | Cook ............................. 188/284 |
| 5,261,843 | A | * | 11/1993 | Tsujii et al. ................. 440/61 R |
| 7,299,907 | B2 | * | 11/2007 | Ferkany ......................... 188/286 |

FOREIGN PATENT DOCUMENTS

DE   102 43 332 A1   4/2004
FR     2 370 196 A2   6/1978

* cited by examiner

*Primary Examiner* — Xuan Lan Nguyen
(74) *Attorney, Agent, or Firm* — Birch, Stewart, Kolasch & Birch, LLP

(57) ABSTRACT

The present invention relates to devices for damping the movement of a body Co between two positions at the end of travel. The device according to the invention is essentially characterized in that it comprises two abutments B1, B2, a cylinder 10, a wall 11 closing off the end 12 of the cylinder 10, a piston 14 delimiting a chamber 16 with variable volume, a cylinder 20 with an external section at most equal to the internal section of the cylinder 10, a mounting unit for mounting the cylinder 20 in cooperation with the piston 14 so that the latter closes off the end 21 of this cylinder 20, a piston 24 delimiting a chamber 26 with variable volume, a first fluid Li filling the two chambers 16, 26, a communicating unit 30 for communication under pressure loss between the chambers 16, 26, an abutment 40 mounted in cooperation with the piston 24 so that this abutment 40 has a movement correlative with that of the piston 24, and a connecting unit 50 for connecting the cylinder 20 to the body Co. Application notably to the control for opening and closing an aircraft door.

19 Claims, 3 Drawing Sheets

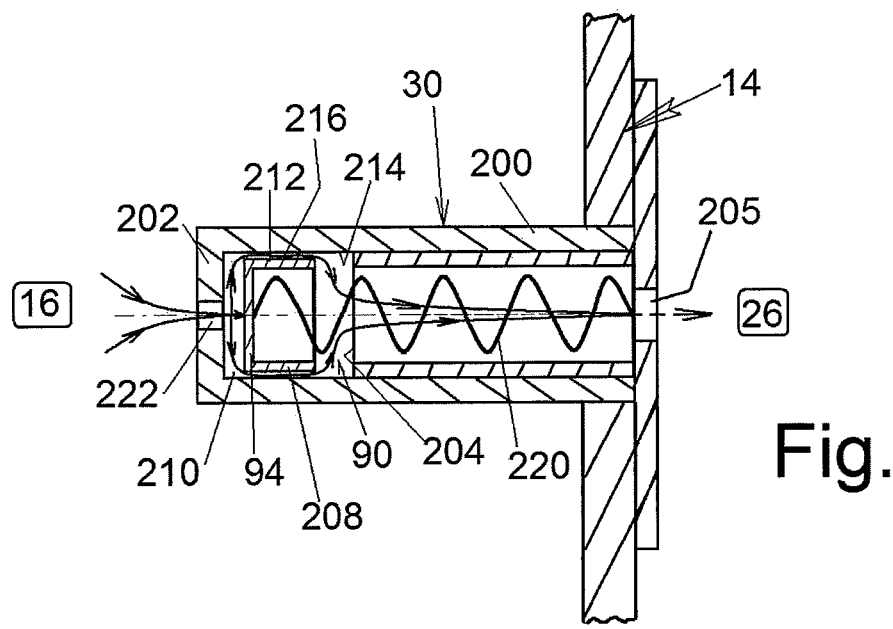
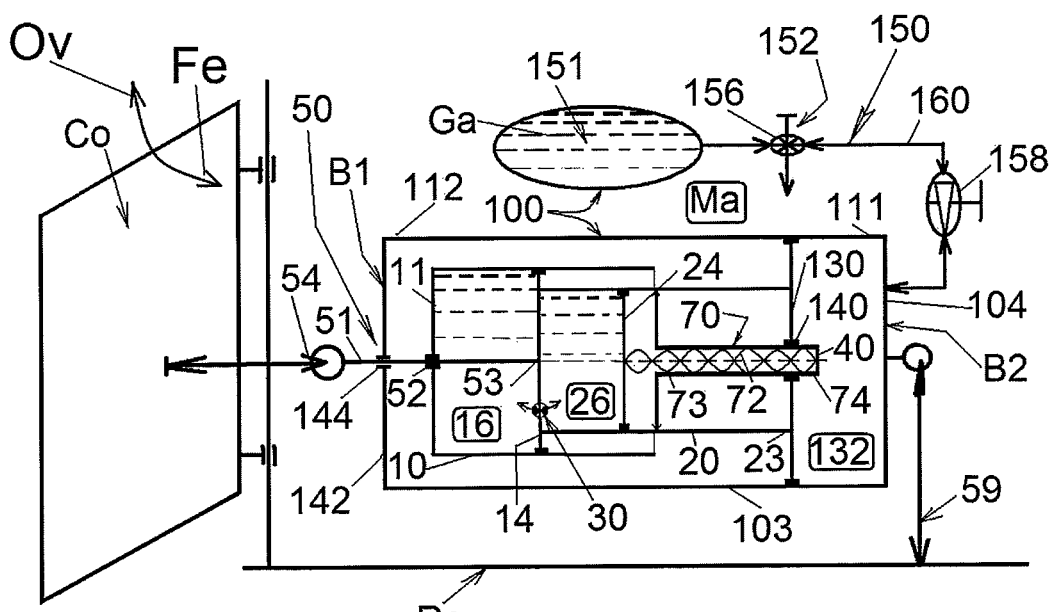

DEVICE FOR DAMPING THE MOVEMENT OF A BODY AT THE END OF TRAVEL

BACKGROUND OF THE INVENTION

1. Field of the Invention

The present invention relates to the damping devices called "end-of-travel" devices for damping the movement of a body capable of moving between two positions relative to a given frame of reference, which find a particularly advantageous application as devices for damping the movement of an aircraft door at the end of travel, for which the frame of reference is the aircraft cabin and the two positions are respectively its open position and its closed position.

2. Description of the Related Art

It is known that, in many fields, bodies must be moved between two positions in a relatively rapid manner and in total security. Such is the case for example with an aircraft door, from its closed position to its open position and vice versa.

Such a movement can be made by means of devices that can be controlled automatically and that are therefore complex because they must simultaneously provide control of the movement and modulate it so that, notably at the end of travel, the movement is slowed.

Devices are even known that make it possible to achieve the same result, that is to say prevent these bodies from being positioned too violently at the end of travel against abutments called "end-of-travel" abutments, when these bodies are moved manually. In the case of aircraft or aeroplane doors, these devices are handled by the cabin crew. However, it may happen that, essentially when they are opened towards the outside of the aircraft, the movement is accelerated by unforeseen phenomena, essentially by gusts of wind, or intentional phenomena for example when there is an emergency opening command.

It is therefore also important, even in these latter cases, to damp the end of travel of the movement of an aircraft door in order to prevent damaging both the door itself and its surroundings which are incorporated into the structure of the aeroplane.

Currently such end-of-travel dampers exist that make it possible to obtain these results. But their structure is relatively complex which has the drawback of making them very costly, heavy and bulky and even often makes them less reliable.

BRIEF SUMMARY OF THE INVENTION

Therefore the object of the present invention is to produce an end-of-travel damper that alleviates to a large extent the drawbacks of the similar devices of the prior art such as those mentioned above, and which finds an advantageous application for the opening Ov and the closing Fe of the doors of aircraft in particular, and that has a structure that is simple and easy to produce, notably on an industrial scale.

More precisely, the subject of the present invention is a device for damping, at the end of travel, of the movement of a body capable of moving between two positions, a first and a second position, relative to a given frame of reference, characterized in that it comprises:
  a first abutment defining the first position, this said first abutment being connected to the said frame of reference,
  a second abutment defining the second position, this said second abutment being connected to the said frame of reference,
  a first cylinder,
  a first wall closing off a first end of the said first cylinder and capable of coming into contact with the said first abutment,
  a first piston mounted so as to slide sealingly in the said first cylinder in order to delimit between it, the internal wall of the first cylinder and the said first wall, a first chamber with a volume that can vary according to the sliding of the first piston in the first cylinder,
  a second cylinder with an external section at most equal to the internal section of the first cylinder,
  means for mounting the said second cylinder in cooperation with the first piston so that the latter closes off a first end of the said second cylinder and that this second cylinder is not situated in the first chamber,
  a second piston mounted so as to slide sealingly in the said second cylinder in order to delimit between it, the internal wall of the second cylinder and the said first piston, a second chamber with a volume that can vary according to the sliding of the second piston in the second cylinder,
  a first fluid filling the two chambers, the first and second chamber,
  means for placing the said first and second chambers in fluidic communication under a pressure loss of at least a given value,
  a third abutment capable of coming into contact with the said second abutment,
  means for mounting the said third abutment in cooperation with the said second piston so that this said third abutment has a movement correlative with that of the second piston and that it is situated in the half-space delimited by the said second piston and opposite to that in which the second chamber is situated,
  means for connecting the said second cylinder to the said body, and
  means for connecting the said second cylinder to the said frame of reference.

According to another feature of the present invention, the said pressure loss under which the said first and second chambers are in fluidic communication has at least two different values, this said pressure loss consisting of a diaphragm with variable section and means for varying the section of this said diaphragm between two different values, the means for varying the section of this diaphragm between two different values consisting of:
  a third cylinder comprising a bottom,
  a piston seat situated in the said third cylinder, the said piston seat comprising a fluidic outlet to the said second chamber,
  a third piston mounted so as to slide in the said third cylinder between the bottom of this third cylinder and the piston seat, while determining, with the bottom and the internal wall of the third cylinder, a third chamber with variable volume, the space defined between the said third piston and the said piston seat determining the said diaphragm with variable section, this third piston also being mounted slidingly so that, between its cylindrical lateral face and the internal wall of the third cylinder, there is defined a fluidic communication space the effective section of which is smaller than the effective section of the third piston,
  means for applying an elastic force to the said third piston in order to tend to hold it to the bottom wall of the third cylinder, and
  means for placing the third chamber in fluidic communication without a notable pressure loss with the first chamber.

According to another feature of the present invention, the device comprises means for controlling the movement of the body relative to the frame of reference between the first and second abutments, these means for controlling the movement of the body relative to the frame of reference between the first and second abutments advantageously consisting of:
- a fourth cylinder with an internal section at least equal to the external section of the first cylinder,
- a second wall closing off a first end of the fourth cylinder, the said fourth cylinder being mounted surrounding the said first cylinder so that the second wall is situated facing the second end of the second cylinder,
- a fourth piston mounted so as to slide sealingly in the said fourth cylinder in order to delimit between it, the internal wall of the fourth cylinder and the second wall, a fourth chamber with a volume that can vary according to the sliding of the fourth piston in the fourth cylinder, the said fourth piston being mounted in cooperation with the said second cylinder so as to close off the second end of this said second cylinder, and
- means for supplying the fourth chamber with a second fluid.

BRIEF DESCRIPTION OF THE DRAWINGS

Other features and advantages of the present invention will appear during the following description given with respect to the drawings that are appended by way of illustration but are in no way limiting, in which:

FIG. 2 is a relatively simplified view in section of a preferred embodiment of a detail of the structure of the damper schematized in FIG. 1, FIG. 3 is a diagram of a second embodiment of the damper according to the invention, enhanced relative to the embodiment according to FIG. 1, more particularly in its application to the control of the movement of an aircraft door.

DETAILED DESCRIPTION OF THE INVENTION

Figure 1:
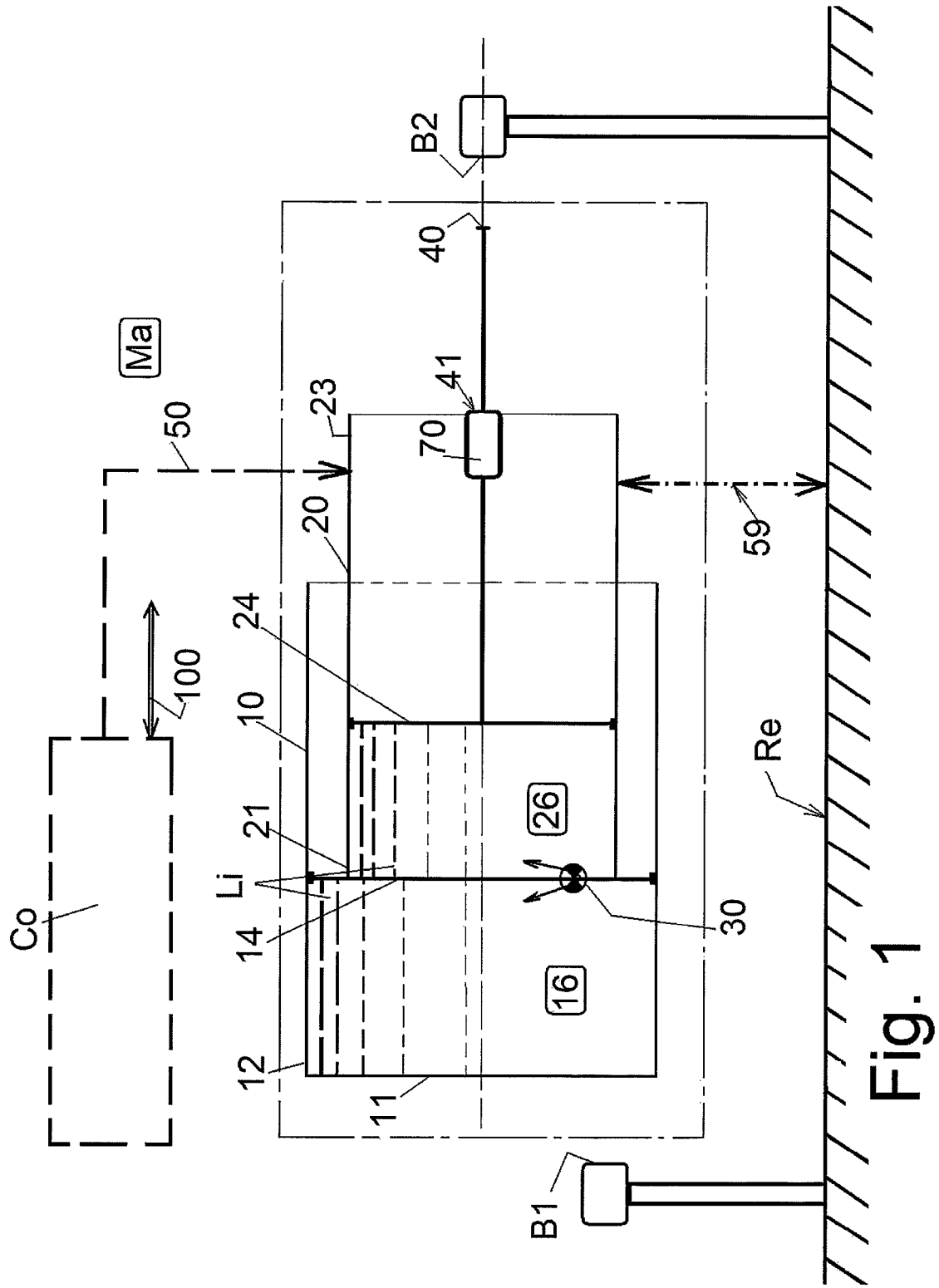
FIG. 1 is a diagram of a first embodiment of the damper according to the invention.

It is first of all specified that, in the figures, the same references designate the same elements irrespective of the figure in which they appear and whatever the form of representation of these elements. Similarly, if some elements are not specifically referenced in one of the figures, their references can be easily found by referring to another figure.

It is also specified that the figures represent essentially two embodiments of the subject according to the invention, but that there may be other embodiments that reflect the definition of this invention.

It is also specified that, when, according to the definition of the invention, the subject of the invention comprises "at least one" element having a given function, the embodiment described may comprise several of these elements. Reciprocally, if the embodiment of the subject according to the invention as illustrated comprises several elements of identical function and if, in the description, it is not specified that the subject according to this invention must of necessity comprise a particular number of these elements, the subject of the invention can be defined as comprising "at least one" of these elements.

It is finally specified that when, in the present description, an expression defines on its own, with no particular specific mention concerning it, a set of structural features, these features may be taken, for the definition of the subject of the requested protection, when technically possible, either separately, or in total and/or partial combination.

It is also added that, in the present description:
- the term "cylinder" must be understood as defining a body of hollow cylindrical shape, usually of revolution on a given axis, like that of a hydraulic or pneumatic jack,
- the expression "piston mounted so as to slide sealingly in the . . . cylinder" must be understood as defining an element that takes the general form of a disc or a similar element the edge of which has a complementary or substantially complementary shape to that of the internal wall of the cylinder as defined above, in the knowledge that this element can slide axially in the cylinder in a sealed manner, for example by virtue of an annular seal or similar element (or several seals mounted in series), while noting that those skilled in the art will be able to choose the nature of the material, the section, and the shape of this (these) seal(s) depending on the result that must be obtained. In summary, such a "piston" is similar to that of the hydraulic or pneumatic jacks that are devices well known per se notably by those skilled in the art,
- the term "passageway" must be understood as defining an orifice passing through any wall, made in this wall in order to allow to pass through this wall, in a sealed or unsealed manner, a solid element of whatever nature, whether or not the latter moves relative to this wall,
- the expression "sealed passageway" must be understood as defining a "passageway" as defined above, but so that there is sealing between the solid element and the wall in which the orifice is made, this sealing being able to be of any nature, obtained by a seal or seals that may or may not be solid, a seal or seals that may or may not rotate, contactless sealing systems, etc., in the wall of the orifice and/or in that of the solid element. Since the nature of this sealing is suited to the results to be obtained, it will be determined by those skilled in the art.

This being specified, with reference notably to FIG. 1, the present invention relates to a device for damping, at the end of travel, of the movement of a body Co capable of moving between two positions, a first and a second position, relative to a given frame of reference Re, while specifying that this damping must be achieved when the body reaches its first position coming from its second position, and vice versa, that is to say when this same body reaches its second position coming from its first position.

In other words, the body must have a relatively rapid movement between its first and second positions, but its movement must be greatly damped, while being greatly slowed, when it reaches one of these first and second positions.

The device comprises a first abutment B1 defining the first position of the body in motion, this first abutment being connected integrally, for example fixed, to the frame of reference Re, and a second abutment B2 defining the second position of the body in motion, this second abutment also being integrally connected to the frame of reference Re.

The respective arrangements of these two abutments are determined such that they correspond respectively to the two, first and second, positions that the body Co can take.

The device also comprises a first cylinder 10, a first wall 11 closing off a first end 12 of this first cylinder 10, a first piston 14 mounted so as to slide sealingly in the first cylinder 10 in order to delimit between it, the internal wall of the first cylinder 10 and the first wall 11, a first chamber 16 with a volume that can vary according to the sliding of this first piston 14 in the first cylinder 10, a second cylinder with an external section at most equal to the internal section of the first cylinder 10, and means for mounting this second cylinder in cooperation with the first piston 14 so that the latter closes off a first end 21 of the second cylinder 20 and that this second cylinder is not situated in the first chamber 16.

The device also comprises a second piston 24 mounted so as to slide sealingly in the second cylinder 20 in order to delimit between it, the internal wall of the second cylinder 20 and the first piston 14, a second chamber 26 with a volume that can vary according to the sliding of the second piston in the second cylinder 20.

A first fluid Li, preferably incompressible such as oil or a similar fluid, fills the first and second chambers 16, 26. Moreover, means 30 are provided for placing these first and second chambers 16, 26 in fluidic communication under a pressure loss 90 of at least a predetermined given value. Such a pressure loss 90 can for example be a calibrated orifice made in the first piston 14 which is a wall common to the two, first and second, chambers 16, 24, but a particularly advantageous embodiment of this pressure loss 90 will be described in greater detail below with respect to FIG. 2 and to FIGS. 4 to 6.

The device also comprises a third abutment 40, means 41 for mounting this third abutment 40 in cooperation with the second piston 24 so that this third abutment 40 has a movement correlative with that of the second piston 24 and that it is situated in the half-space delimited by the second piston 24 and opposite to that in which the second chamber 26 is situated, means 50 for connecting the second cylinder 20 to the body Co, and means 59 for connecting this second cylinder 20 to the frame of reference Re, so that, when the first cylinder 10 moves relative to the frame of reference Re as will be explained below, and this body Co moves towards its first position, the first wall 11 is capable of coming into contact with the first abutment B1 and, when this same body Co moves towards its second position, this third abutment 40 is able to come into contact with the second abutment B2.

As mentioned above, the device comprises means 50 for connecting the second cylinder 20 to the body Co. These connection means 50 can be of any type and can be easily determined by those skilled in the art. However, one advantageous embodiment of these means will be described more particularly with respect to FIGS. 3 to 6.

The device also comprises means 100, schematically illustrated by the double arrows of FIG. 1, for controlling the movement of the body Co relative to the frame of reference Re between the first and second abutments B1, B2. These control means 100 may for example consist in manually moving the body Co between its two positions. However, according to a preferred embodiment, at least in certain cases, they may have a structure such as that described below with respect to FIGS. 3 to 6.

According to another advantageous feature of the invention, the means 41 for mounting the third abutment in cooperation with the second piston 24 are arranged such that this third abutment is constantly outside the volumes delimited by the first and second cylinders 10, 20, irrespective of the relative position of these two cylinders as explained below.

It is moreover quite clear that, depending on the locations in which it must be operational, such a device may be subjected to considerable temperature variations, as in the case of its application to the opening Ov and the closing Fe of an aircraft door as mentioned in the preamble of the present description.

It is therefore necessary that the distance separating the two, first and second, positions from the body Co remain substantially constant.

Therefore, preferably, the device also comprises compensation means 70 allowing the distance between the first wall 11 and the third abutment 40 to remain constant irrespective of the variation in temperature, at least within certain limits.

According to one advantageous embodiment, of a known type, these compensation means 70 consist, as in FIG. 3, of an oblong element 72 of which the length is a function of the ambient temperature and of the means 73 for mounting this oblong element 72 between the second piston 24 and the third abutment 40.

Figure 4:
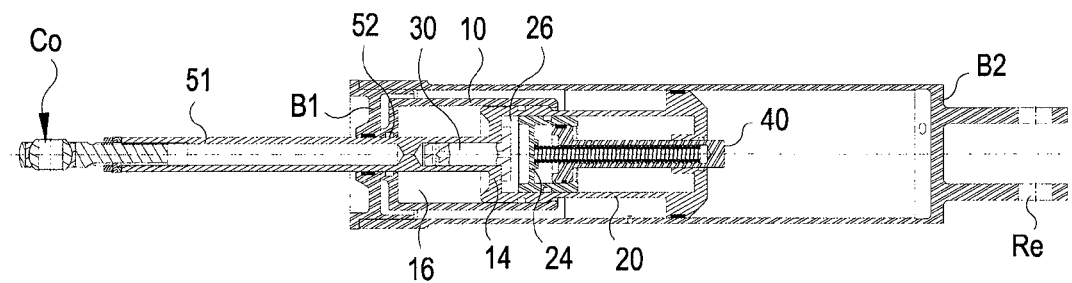
FIGS. 4 to 6 represent respectively three views in section of one and the same industrial embodiment of the end-of-travel damper according to the invention in line with the second embodiment according to the diagram of FIG. 3, these three FIGS. 4 to 6 representing the damper in three different configurations during its operation.
Figure 5:
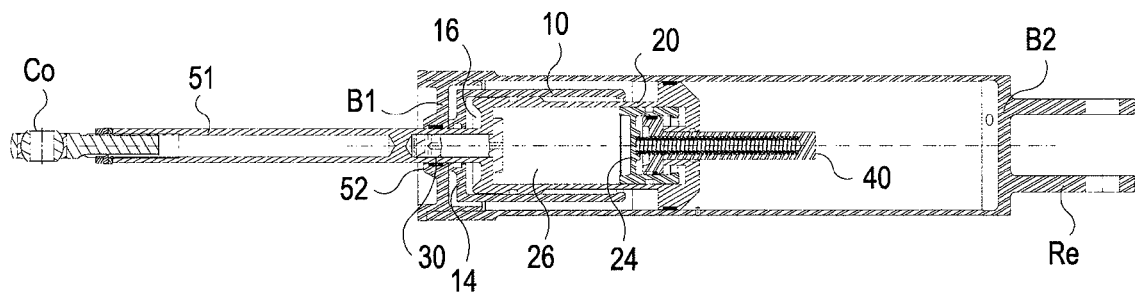
Figure 6:
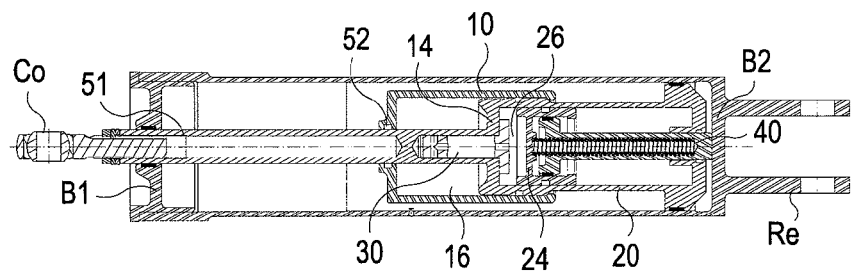

Preferably, as illustrated in FIG. 3, and in FIGS. 4 to 6, these means 73 for mounting the oblong element 72 between the second piston 24 and the third abutment 40 consist of a sheath 74, the oblong element 72 being partially inserted, by a first end, into this sheath, its second end being connected to the second piston 24, for example integrally.

It should be noted that, in this embodiment according to FIG. 3, the bottom of the sheath in fact forms the third abutment 40 defined above.

Advantageously, the end of the sheath opposite to its bottom is guided slidingly relative to the internal wall of the second cylinder 20, as illustrated in FIG. 3.

As an exemplary embodiment, according to FIGS. 4 to 6, in a known manner, this oblong element 72 may consist of a winding with adjacent turns of a metal or similar wire.

Such compensation means 70 are well known per se and will therefore not be more fully described here, for the sole purpose of simplifying the present description.

According to another advantageous embodiment, as illustrated in FIGS. 3 to 6, the means 50 for connecting the second cylinder 20 to the body Co consist of a rod 51 passing through the first wall 11 via a sealed passageway 52 while being capable of sliding in this sealed passageway, a first end 53 of this rod 51 being mounted integrally on the first piston 14, notably via the face of this piston turned towards the first chamber 16, and its second end 54 being connected to the body Co by any means adapted to the mode of movement of this body, translation and/or rotation (i.e. fixed point, spindle and rotary bearing, swivel joint, etc.), the length of the rod 51 also being determined so that this second end 54 is constantly outside the first chamber 16, irrespective of the relative position of the first piston 14 relative to the first cylinder 10.

The embodiment of the device according to the invention described above, with respect to FIGS. 1 and 3 to 6, operates in the following manner:

It is first of all assumed that, with reference to the appended figures, the body Co moves from the second abutment B2 to the first abutment B1.

On arriving close to this first abutment, the damping device according to FIG. 1 is in an industrial configuration like that illustrated in FIG. 4, that is to say with the first wall 11 making contact with the first abutment B1.

In this configuration, the first chamber 16 has its maximum volume. When the movement of the body Co continues, after the first wall 11 has made contact with the first abutment B1, there is exerted on the first piston 14 via the rod 51 a tension force generated by the force that moves the body Co. This tension force tends to reduce the volume of the first chamber 16 and correlatively to increase that of the second chamber 26 by the transfer of the fluid Li, from the chamber 16 to the chamber 26, while passing through the communication means 30 with pressure loss 90.

In a manner known per se, this pressure loss 90 retards the flow of the fluid Li from the first chamber 16 to the second chamber 26, which causes a damping of the movement of the body Co. The higher the pressure loss 90, the greater this damping.

When the first wall 11 makes contact with the first abutment B1, the movement of the body Co is therefore damped and this is so over the whole possible length of the first chamber 16, between its maximum volume, FIG. 4, and its minimum volume, FIG. 5.

When the body Co has fully arrived at its first position, which is defined by the first abutment B1, the third abutment 40 is as far as possible from the second abutment B2 and the chamber 26 has its maximum volume, FIG. 5.

If it is now necessary to move the body Co from its first position defined by the first abutment B1 to its second position defined by the second abutment B2, a force, for example a manual force, is applied to it, which moves, until the third abutment 40 comes into contact with the second abutment B2, to the second abutment B2, the assembly comprising essentially the first and second cylinders 10, 20 with the first and second pistons 14, 24, and the abutment 40 integral with the second piston, while noting that, as mentioned above, the chamber 26 has its maximum volume.

When the movement of the body Co is maintained, a thrusting force is applied to the second cylinder 20 via the rod 51 and the first piston 14. However, since the third abutment 40 is in contact with the second abutment B2, the relative movement of the second piston 24 with respect to the second cylinder tends to reduce the volume of the chamber 26, and correlatively increase that of the chamber 16, by a transfer of the fluid Li, from the chamber 26 to the chamber 16 passing through the means 30 under the pressure loss 90, in a process that is the reverse of that explained above.

In the same way as explained above, the movement of the body, from its first to its second position, is damped at the end of travel on coming into contact with the second abutment, by the passage of the fluid Li into the pressure loss 90 between the chamber 26 and the chamber 16.

When the body Co has reached its second position, the volume of the chamber 26 is the minimum, that of the chamber 16 is the maximum, FIG. 6, and the device is ready to damp the end of travel of a new movement of the body to its first position, FIGS. 4 and 5.

The operation described above of the damping device according to the invention is the position when the body Co moves in a normal and usual movement. However, as mentioned before, it may happen, for example in the case of the opening Ov of an aircraft door, that its movement is accelerated usually in an unintentional manner.

To alleviate this situation, the communication means 30 having a determined fluidic pressure loss 90 are advantageously made as described below more particularly with respect to FIG. 2.

According to the enhanced and advantageous embodiment in line with that of FIG. 2, the pressure loss 90 consists of a diaphragm with variable section and of means 94 for varying the section of this diaphragm between two values.

Preferably, the diaphragm consists of the space lying between a third piston 208 and a piston seat 204. As for the means 94 for varying the section of this diaphragm between two values, they consist of a third cylinder 200 comprising a bottom 202 and in which the third piston 208 is mounted slidingly and in which the piston seat 204 is produced. The piston seat comprises a fluidic outlet 205 to the second chamber 26. The third piston 208 is mounted slidingly in the third cylinder 200 between the bottom 202 of this third cylinder and the piston seat 204, while determining, with the bottom 202 and the internal wall 214 of the third cylinder, a third chamber 210 with variable volume.

The third piston 208 is mounted slidingly so that, also, between its cylindrical lateral face 212 and the internal wall 214 of the third cylinder 200, a fluidic communication space 216 is defined the effective section of which is smaller than the effective section of the third piston 208.

The means 94 also comprise means 220 for applying an elastic force to the third piston 208, such as a spring or similar element, in order to try to hold it towards the bottom wall 202 of the third cylinder 200, and means 222 for placing the third chamber 210 in fluidic communication, without notable pressure loss, with the first chamber 16, for example an orifice of large section relative to that of the diaphragm.

As mentioned above, the third piston 208 is mounted slidingly in the third cylinder 200 so that, between its cylindrical lateral face 212 and the internal wall 214 of the third cylinder, a fluidic communication space 216 is defined. Specifically, the piston is mounted slidingly in the third cylinder 200 in an unsealed manner, the effective section of this space being smaller than the effective section of the third piston 208, that is to say that the section for the flow of the fluid Li between the piston 208 and the internal wall 214 is markedly smaller than the surface area of the piston 208 to which the pressure of the fluid originating from the first chamber 16 is applied and which is slightly smaller than the cross section of the third cylinder. The difference in section between that of the piston 208 and that of the internal wall of the third cylinder 200 is in fact the section of the fluidic communication space 216.

In the event of a violent acceleration in the movement of the body Co, from the second abutment B2 to the first abutment B1, for example in the application of the device according to the invention to the opening Ov of an aircraft door under the action of an unexpected gust of wind, the pressure loss 90 as described above with respect to FIG. 2 intervenes to attenuate this unexpected acceleration as described below.

If the movement of the body Co in the direction defined above, that is to say towards the first abutment B1, is accelerated, the first fluid Li contained in the first chamber 16 sustains an excess pressure which is applied to the third piston 208 via the orifice 222 and the third chamber 210. The third piston 208 is then moved, against the spring means 220, towards the piston seat 204, which reduces the section of the diaphragm and therefore increases the pressure loss 90 of the transfer of the fluid Li, from the first chamber 16 to the second chamber 26. This increase in pressure loss 90 causes an additional damping relative to the damping usually obtained as described above and, in the case of the application to the opening Ov of an aircraft door, prevents possible incidents at the end of travel when the door opens too quickly.

It may also be necessary to urgently command the movement of the body Co to the first abutment B1. This is notably the situation for applying the device to controlling the opening Ov of an aircraft door, in an emergency and much more rapidly than normal, for example for reasons of safety in the event of any danger.

To respond to this situation, the damping device according to the invention has an embodiment that is enhanced relative to that illustrated in FIG. 1, which is shown schematically in FIG. 3 and partially, in an industrial embodiment, in FIGS. 4 to 6.

According to this embodiment, the means 100 for controlling the movement of the body Co relative to the frame of reference Re between the first and second abutments B1, B2 consist of a fourth cylinder 103 with an internal section at least equal to the external section of the first cylinder 10, a second wall 104 closing off a first end 111 of this fourth cylinder 103, the fourth cylinder being mounted surrounding the first cylinder 10 so that the second wall 104 is situated facing the second end 23 of the second cylinder 20, a fourth piston 130 mounted so as to slide sealingly in this fourth cylinder 103 in order to delimit between it, the internal wall of the fourth cylinder 103 and the second wall 104, a fourth chamber 132 with a volume that can vary according to the sliding of the fourth piston 130 in the fourth cylinder 103, this fourth piston 130 being mounted in cooperation with the second cylinder 20 so as to close off the second end 23 of this second cylinder, and means 150 for supplying the fourth chamber 132 with a second fluid Ga, preferably a pressurized gas.

This fourth cylinder 103 in fact forms the frame of reference Re defined above. Moreover, according to this latter embodiment, the means 59 defined above for connecting the second cylinder 20 to the frame of reference Re then consist of the fourth piston 130 which is integral with the second cylinder 20 and which is mounted slidingly in and relative to this fourth cylinder 103.

In the situation of the application to the opening Ov and closing Fe of an aircraft door, this fourth cylinder 103 will usually be integral with a door arm so as to actuate the damping system during the opening and closing movement of the door.

Nevertheless it is also preferable that the second end 112 of the fourth cylinder 103 is advantageously at least partially closed off by a third wall 142 which is passed through by the rod 51 by means of a passageway 144 that is not necessarily sealed, but advantageously having at least a certain degree of sealing for reasons of keeping the inside of the fourth cylinder 103 protected from impurities or similar elements, in order to give the device according to the invention the longest possible reliability. This third wall 142 may also form the first abutment B1 defined above.

In this case of the embodiment according to FIGS. 3 to 6, the sheath 74 defined above passes through the fourth piston 130 via a second sealed passageway 140, by sliding therein.

According to a possible and preferred embodiment, the means 150 for supplying the fourth chamber 132 with the second fluid Ga consist of a reservoir 151 filled with this second fluid under great pressure and controllable means 152 for fluidically connecting this reservoir with the fourth chamber 132.

Advantageously, these controllable means 152 for fluidically connecting the reservoir 151 with the fourth chamber 132 comprise a duct 160 connecting this fluid reservoir 151 and the fourth chamber 132, a valve 156, advantageously with rapid control, mounted in series in the duct 160 and, optionally, between the valve 156 and the fourth chamber 132, a pressure-release device 158 also mounted in series in this same duct 160.

For the purpose that will be explained below, the device also comprises means for placing the fourth chamber 132 in communication with the ambient environment Ma when it is not supplied with second fluid Ga.

Preferably, these means for placing the fourth chamber 132 in communication with the ambient environment when it is not supplied with second fluid Ga consist of the portion of duct 160 lying between the fourth chamber 132 and the valve 156, due to the fact that the valve consists of a valve with two ways, a first and a second way, such that, if one is open, the other is not open, the first way connecting the fourth chamber 132 to the ambient environment Ma and the second way connecting the fourth chamber 132 to the reservoir 151, and due to the fact that, when the valve is in its rest state, that is to say not controlled, the first way is in its open state.

The device according to the invention described above with reference to FIGS. 3 to 6 operates in the following manner, in the situation of the emergency control to open Ov a door particularly of an aircraft:

It is however first necessary to specify that, when the device has the embodiment schematically illustrated in FIG. 3 and according to the industrial embodiment in FIGS. 4 to 6, and when the opening Ov and the closing Fe of the door must be carried out in normal conditions, the device according to the invention operates as described above.

Specifically, the fourth piston 130 then follows without difficulty the movement of the door Co since it is integrally connected to it by the following four means: (i) means for connecting the end 54 of the rod 51 to the door Co, (ii) the rod 51, (iii) the first piston 14 and (iv) the cylinder 20 to which this fourth piston 130 is attached, and since the fourth chamber 132 is constantly, in this case, opened to the atmosphere Ma by the two-way valve 152 which is in its rest state.

The fourth chamber 132 being opened to the ambient atmosphere Ma via the two-way valve 152, this fourth chamber 132 can alternately empty and fill during the opening Ov and closing Fe movement of the door, relative to the ambient environment, without the "syringe" effect that is well known per se to those skilled in the art.

On the other hand, when, for whatever reason, the door needs to be opened urgently very quickly, the embodiment schematically illustrated in FIGS. 3 to 6 operates in the following manner:

If it is decided to open Ov the door very rapidly, the person responsible for this job acts on the two-way valve 152 which is advantageously of the rapid-triggering type, in order to switch it to its state in which its second way is open.

The compressible fluid Ga contained in the reservoir 151 then flows through the duct 160 to the fourth chamber 132, at a predetermined suitable pressure, via the pressure-release device 156.

Under the pressure of the fluid Ga, this fourth chamber 132 which is no longer opened to the atmosphere Ma increases in volume, which rapidly pushes the fourth piston 130 back towards the first abutment B1, taking with it the four means defined above (i) to (iv) which are secured together.

The supply pressure of this fourth chamber 132 is naturally determined in order to rapidly control the opening of the door, but the end of travel on opening Ov will be damped by the presence of the incompressible fluid Li contained in the first and second chambers 16, 26, as described above.

Returning the device to its initial state for an operation in normal conditions poses no problem to those skilled in the art. The modalities required for this return to the initial state of the device will not be described here purely for the purposes of not complicating this description.

Based on the description given above, it is evident that the objects of the present invention that are defined in the preamble of this description are fully achieved, as are others.

The invention claimed is:

1. Device for damping, at the end of travel, of the movement of a body capable of moving between two positions, a first and a second position, relative to a given frame of reference, the device comprising:
   a first abutment defining the first position, this said first abutment being connected to the said frame of reference,
   a second abutment defining the second position, this said second abutment being connected to the said frame of reference, a first cylinder,
a first wall closing off a first end of the said first cylinder and capable of coming into contact with the said first abutment,
a first piston mounted to slide sealingly in the said first cylinder in order to delimit between it, the internal wall of the first cylinder and the said first wall, a first chamber with a volume varying according to the sliding of the said first piston in the first cylinder,
a second cylinder with an external section at most equal to the internal section of the first cylinder,
means for mounting the said second cylinder in cooperation with the first piston, the first piston closing off a first end of the said second cylinder and this second cylinder being not situated in the first chamber,
a second piston mounted to slide sealingly in the said second cylinder in order to delimit between it, the internal wall of the second cylinder and the said first piston, a second chamber with a volume varying according to the sliding of the second piston in the second cylinder,
a first fluid filling the two chambers, the first and second chambers,
means for placing the said first and second chambers in fluidic communication under a pressure loss of at least a given value,
a third abutment capable of coming into contact with the said second abutment,
means for mounting the said third abutment in cooperation with the said second piston, this said third abutment having a movement correlative with that of the second piston and being situated in the half-space delimited by the said second piston and opposite to that in which the second chamber is situated,
means for connecting the said second cylinder to the said body, and
means for connecting the said second cylinder to the said frame of reference, wherein the means for connecting the second cylinder to the body consist of a rod passing through the first wall via a first sealed passageway and capable of sliding in the said first sealed passageway, a first end of the said rod being mounted integrally on the first piston on its face turned towards the first chamber and its second end being connected to the body, the length of the said rod being determined to have this second end outside the said first chamber.

2. Device according to claim 1, wherein the means for mounting the said third abutment in cooperation with the said second piston are arranged such that the said third abutment is outside the volumes delimited by the said first and second cylinders.

3. Device according to claim 2, further comprising means for compensating for the distance between the first wall and the third abutment depending on the temperature variations.

4. Device according to claim 3, wherein the compensation means consist of an oblong element of which the length value is a function of the ambient temperature and of the means for mounting the said oblong element between the said second piston and the said third abutment.

5. Device according to claim 1, further comprising means for compensating for the distance between the first wall (11) and the third abutment depending on the temperature variations.

6. Device according to claim 5, wherein the compensation means consist of an oblong element of which the length value is a function of the ambient temperature and of the means for mounting the said oblong element between the said second piston and the said third abutment.

7. Device according to claim 6, wherein the means for mounting the said oblong element between the said second piston and the said third abutment consist of a sheath, the said oblong element being partially inserted, by a first end, into the said sheath, its second end being connected to the second piston, the bottom of the said sheath forming the said third abutment.

8. Device according to claim 1, wherein the pressure loss under which the said first and second chambers are in fluidic communication has at least two values.

9. Device according to claim 8, wherein said pressure loss of at least two values consists of a diaphragm with variable section and means for varying the section of the said diaphragm between two values.

10. Device according to claim 9, wherein the means for varying the section of the diaphragm between two values consist of:
a third cylinder comprising a bottom,
a piston seat situated in the said third cylinder, the said piston seat comprising a fluidic outlet to the said second chamber,
a third piston mounted to slide in the said third cylinder between the bottom of this third cylinder and the piston seat, while determining, with the bottom and the internal wall of the third cylinder, a third chamber with variable volume, the space defined between the said third piston and the said piston seat determining the said diaphragm with variable section, this third piston also being mounted slidingly, between its cylindrical lateral face and the internal wall of the third cylinder, a fluidic communication space the effective section of which is smaller than the effective section of the third piston being defined,
means for applying an elastic force to the said third piston in order to tend to hold it to the bottom wall of the third cylinder, and
means for placing the third chamber in fluidic communication without a pressure loss with the first chamber.

11. Device according to claim 1, further comprising means for controlling the movement of the body relative to the frame of reference between the first and second abutments.

12. Device according to claim 11, wherein the means for controlling the movement of the body relative to the frame of reference between the first and second abutments consist of:
a fourth cylinder with an internal section at least equal to the external section of the first cylinder,
a second wall closing off a first end of the fourth cylinder, the said fourth cylinder being mounted surrounding the said first cylinder, the second wall being situated facing a second end of the second cylinder,
a fourth piston mounted to slide sealingly in the said fourth cylinder in order to delimit between it, the internal wall of the fourth cylinder and the second wall, a fourth chamber with a volume varying according to the sliding of the fourth piston in the fourth cylinder, the said fourth piston being mounted in cooperation with the said second cylinder, closing off the second end of this said second cylinder, and
means for supplying the fourth chamber with a second fluid.

13. Device according to claim 12, wherein the means for supplying the fourth chamber with a second fluid consist of a reservoir of the said second fluid under pressure and controllable means for fluidically connecting the said reservoir with the said fourth chamber.

14. Device according to claim 13, wherein the controllable means for fluidically connecting the said reservoir with the said fourth chamber comprise a duct connecting the said fluid reservoir and the said fourth chamber, a rapid-control valve mounted in series in the said duct and, between the said valve and the said fourth chamber, a pressure-release device.

15. Device according to claim 12, further comprising a third wall closing off the second end of the fourth cylinder opposite to its first end, the said rod passing through this said third wall through a passageway that is sealed, this said third wall forming the first abutment.

16. Device according to claim 12, wherein the first and second fluids are respectively an incompressible fluid and a compressible fluid.

17. Device for damping, at the end of travel, of the movement of a body capable of moving between two positions, a first and a second position, relative to a given frame of reference, the device comprising:
 a first abutment defining the first position, this said first abutment being connected to the said frame of reference,
 a second abutment defining the second position, this said second abutment being connected to the said frame of reference,
 a first cylinder,
 a first wall closing off a first end of the said first cylinder and capable of coming into contact with the said first abutment,
 a first piston mounted to slide sealingly in the said first cylinder in order to delimit between it, the internal wall of the first cylinder and the said first wall, a first chamber with a volume varying according to the sliding of the said first piston in the first cylinder,
 a second cylinder with an external section at most equal to the internal section of the first cylinder,
 means for mounting the said second cylinder in cooperation with the first piston, the first piston closing off a first end of the said second cylinder and this second cylinder being not situated in the first chamber,
 a second piston mounted to slide sealingly in the said second cylinder in order to delimit between it, the internal wall of the second cylinder and the said first piston, a second chamber with a volume varying according to the sliding of the second piston in the second cylinder,
 a first fluid filling the two chambers, the first and second chambers,
 means for placing the said first and second chambers in fluidic communication under a pressure loss of at least a given value,
 a third abutment capable of coming into contact with the said second abutment,
 means for mounting the said third abutment in cooperation with the said second piston, this said third abutment having a movement correlative with that of the second piston and being situated in the half-space delimited by the said second piston and opposite to that in which the second chamber is situated,
 means for connecting the said second cylinder to the said body,
 means for connecting the said second cylinder to the said frame of reference, and
 means for controlling the movement of the body relative to the frame of reference between the first and second abutments, wherein,
 the means for controlling the movement of the body relative to the frame of reference between the first and second abutments consist of:
 a fourth cylinder with an internal section at least equal to the external section of the first cylinder,
 a second wall closing off a first end of the fourth cylinder, the said fourth cylinder being mounted surrounding the said first cylinder, the second wall being situated facing a second end of the second cylinder,
 a fourth piston mounted to slide sealingly in the said fourth cylinder in order to delimit between it, the internal wall of the fourth cylinder and the second wall, a fourth chamber with a volume varying according to the sliding of the fourth piston in the fourth cylinder, the said fourth piston being mounted in cooperation with the said second cylinder, closing off the second end of this said second cylinder, and
 means for supplying the fourth chamber with a second fluid, and
 said sheath passes through the said fourth piston via a second sealed passageway and slides in this said second sealed passageway.

18. Device for damping, at the end of travel, of the movement of a body capable of moving between two positions, a first and a second position, relative to a given frame of reference, the device comprising:
 a first abutment defining the first position, this said first abutment being connected to the said frame of reference,
 a second abutment defining the second position, this said second abutment being connected to the said frame of reference,
 a first cylinder,
 a first wall closing off a first end of the said first cylinder and capable of coming into contact with the said first abutment,
 a first piston mounted to slide sealingly in the said first cylinder in order to delimit between it, the internal wall of the first cylinder and the said first wall, a first chamber with a volume varying according to the sliding of the said first piston in the first cylinder,
 a second cylinder with an external section at most equal to the internal section of the first cylinder,
 means for mounting the said second cylinder in cooperation with the first piston, the first piston closing off a first end of the said second cylinder and this second cylinder being not situated in the first chamber,
 a second piston mounted to slide sealingly in the said second cylinder in order to delimit between it, the internal wall of the second cylinder and the said first piston, a second chamber with a volume varying according to the sliding of the second piston in the second cylinder,
 a first fluid filling the two chambers, the first and second chambers,
 means for placing the said first and second chambers in fluidic communication under a pressure loss of at least a given value,
 a third abutment capable of coming into contact with the said second abutment,
 means for mounting the said third abutment in cooperation with the said second piston, this said third abutment having a movement correlative with that of the second piston and being situated in the half-space delimited by the said second piston and opposite to that in which the second chamber is situated,
 means for connecting the said second cylinder to the said body,
 means for connecting the said second cylinder to the said frame of reference, and
 means for controlling the movement of the body relative to the frame of reference between the first and second abutments, wherein the means for controlling the movement of the body relative to the frame of reference between the first and second abutments consist of:

a fourth cylinder with an internal section at least equal to the external section of the first cylinder, a second wall closing off a first end of the fourth cylinder, the said fourth cylinder being mounted surrounding the said first cylinder, the second wall being situated facing a second end of the second cylinder, a fourth piston mounted to slide sealingly in the said fourth cylinder in order to delimit between it, the internal wall of the fourth cylinder and the second wall, a fourth chamber with a volume varying according to the sliding of the fourth piston in the fourth cylinder, the said fourth piston being mounted in cooperation with the said second cylinder, closing off the second end of this said second cylinder, and means for supplying the fourth chamber with a second fluid, and the device for damping further comprises:

means for placing the said fourth chamber in communication with the ambient environment when it is not supplied with second fluid.

19. Device according to claim 18, wherein the means for placing the said fourth chamber in communication with the ambient environment when it is not supplied with second fluid consist of the portion of duct lying between the fourth chamber and the valve, due to the fact that the said valve consists of a valve with two ways, a first and a second way, such that, if one is open, the other is not open, the first way connecting the fourth chamber to the ambient environment and the second way connecting the fourth chamber to the reservoir, and due to the fact that, when the said valve is not controlled, the first way is open.

* * * * *